United States Patent [19]

Boutier et al.

[11] Patent Number: 5,069,704
[45] Date of Patent: Dec. 3, 1991

[54] METHOD AND APPARATUS FOR SHAPING CURVED GLASS SHEETS

[75] Inventors: Philippe Boutier, Waterloo;
Jean-Marc Petit-Collin, Thourotte;
Dany-Ange Plebani, Thourotte;
Denis Mathivat, Thourotte;
Christophe Machura,
Chevincourt/Thourotte, all of France

[73] Assignee: Saint-Gobain Vitrage International, Courbevoie, France

[21] Appl. No.: 454,649

[22] Filed: Dec. 21, 1989

[30] Foreign Application Priority Data

Dec. 21, 1988 [FR] France .............................. 88 16894
Mar. 9, 1989 [FR] France .............................. 89 03078
Mar. 9, 1989 [FR] France .............................. 89 03076

[51] Int. Cl.$^5$ ............................................. C03B 23/023
[52] U.S. Cl. ................................... 65/106; 65/158;
65/165; 65/273; 65/287
[58] Field of Search .............. 65/104, 106, 165, 158, 65/273, 287, 28

[56] References Cited

U.S. PATENT DOCUMENTS

| | | | |
|---|---|---|---|
| 3,407,053 | 10/1968 | Schulz | 65/21.5 |
| 3,778,244 | 12/1973 | Nedelec et al. | 65/106 |
| 4,297,118 | 10/1981 | Kellar | 65/104 |
| 4,539,031 | 9/1985 | Fecik et al. | 65/29 |
| 4,764,196 | 8/1988 | Boutier et al. | 65/106 |
| 4,767,437 | 8/1988 | Lampman et al. | 65/104 |
| 4,802,903 | 2/1989 | Kuster et al. | 65/106 |
| 4,802,904 | 2/1989 | Boutier et al. | 65/106 |
| 4,813,993 | 3/1989 | Letemps et al. | 65/273 |
| 4,838,920 | 6/1989 | Blasquez-Gonzales | 65/104 |
| 4,859,225 | 8/1989 | Kuster et al. | 65/104 |
| 4,902,331 | 2/1990 | Vanaschen et al. | 65/106 |

FOREIGN PATENT DOCUMENTS 0217708 11/1988 European Pat. Off. .

Primary Examiner—Joye L. Woodard
Attorney, Agent, or Firm—Oblon, Spivak, McClelland, Maier & Neustadt

[57] ABSTRACT

The invention relates to a production line for curved panes, in which the panes of glass are heated, brought in a horizontal position into a curving station where they are taken over by curving tools, and then finally conveyed into a quenching station, the stages of quenching and of entry of the glass into the curving station being at different heights. Defective glass sheets are removable from the production line intermediate the curving station and the quenching station by cracking with an atomized fluid jet and subsequent crushing.

11 Claims, 4 Drawing Sheets

FIG_1

FIG_2

METHOD AND APPARATUS FOR SHAPING CURVED GLASS SHEETS

BACKGROUND OF THE INVENTION

1. Field of the Invention

This invention relates to a process for the production of curved panes intended notably for automobile vehicles, according to which each sheet of glass is, in a first period, heated above its deformation temperature, conducted into a curving station situated in the continuation of the furnace and in which the high temperature of the glass is maintained and then, after curving, is transferred into a cooling station, for example a thermal quenching station.

2. Description of the Related Art

For producing automobile panes, notably fixed side panes, side window panes, rear panes or windscreens, it is necessary to shape a flat sheet of glass which is cut to the dimensions of the pane, and then to carry out lamination or, more frequently, tempering or toughening of the curved pane in order to give greater safety to the passengers in the case of fracture of the pane.

Many methods of curving, termed horizontal methods, are known, in which the glass sheet is heated above its softening point (500°-700° C.) in an electric furnace, which it passes through conveyed, for example, by a bed of motorized rollers. The heating furnace is followed by a curving station, in which the glass is shaped by specific curving tools and, for example, in which the glass sheet is raised above the conveyor, and applied against a curving mold, and then finally collected by a carriage carrying a ring profiled in a manner corresponding to the final form of the curved pane. Thereafter, the carriage removes the glass sheet, for example towards a quenching or tempering device or other cooling device.

In other cases, reserved almost exclusively for the manufacture of laminated panes, the pair or pairs of glass sheets is deposited, at the entry of the furnace, onto a curving mold, on which it is directly heated for a curving termed curving by collapse.

Without discussing in greater detail the technique of curving used, it should be noted that the greater the accuracy required, and the more complex the shape, the slower the curving operation will be. To operate too rapidly leads to a risk of temporarily creating stresses higher than the strength of the glass and therefore of fracturing the glass. Furthermore, when the cooling step consists of a thermal quenching, for example by blowing on cold air, it is essential for the pane to still be as hot as possible when it enters the tempering station.

For these reasons, the Applicant has chosen, in the present case, to investigate only those shaping methods according to which the temperature of the glass remains virtually constant throughout the curving operation. Constant temperature does not signify total absence of heat exchange with the glass sheet, and moreover the speeds of passage of the glass sheets do not systemically guarantee perfect thermal equilibrium (and this in any case may not be desired, since local overheating promotes folding at these points, for example). On the other hand, the heat exchanges remain of extremely small amplitude, in that it is chosen to carry out the molding in a hot enclosure, the temperature of which is close to that of the glass and not in the open air, where the glass initially at about 650° C. would undergo a very considerable cooling, which would be detrimental to good shaping quality and in particular to the quality of quenching.

From the foregoing considerations it is clear that it is absolutely necessary to avoid abrupt and uncontrolled variations in temperature in the curving station. Moreover, although it is relatively easy thermally to insulate a closed enclosure, it is quite otherwise in the case of a curving station which, of necessity, comprises two entries-exits (for the introduction and removal of the glass sheets and/or the frames mounted on a carriage transporting the curved glass). Lateral leakages occur via the conveyor which removes the glass sheets from the furnace. The conveyor is most commonly composed of rollers, the pinions of which engage on chains arranged outside the hot enclosure in order to simplify the adjustments and, in particular, to obtain reasonably long working lives for the drive motors for these rollers, for which it is well known that it is virtually impossible to operate them continuously and in a satisfactory manner at a temperature in the vicinity of 650° C.

At the inlet side, that is to say at the furnace side, there is no possibility of cold air entering, in view of the fact that the curving station is at the same temperature as the furnace, of which it constitutes, in the limit, the extreme downstream element. The lateral leakages may, furthermore, be prevented to a great extent by appropriate filling or stopping-up. On the other hand, and to the extent to which the production line is situated in a building not subject to flows of air, the feed of cold air which takes place is virtually constant and can therefore be compensated by appropriate heating. In contrast, it is quite otherwise in the case of the outlet from the curving station.

In fact, the opening must be sufficiently wide to enable a curved sheet of glass to pass through, or in certain cases with a height of more than 20 centimeters and a width of approximately 1 m 50 cm if a rear pane is considered. Unless an extraordinarily high energy consumption can be accepted, it is entirely unacceptable to leave an aperture of such dimensions permanently open. And even if it were assumed that the energy cost could be accepted, the special problem of the entry of cold air consequent upon the blowing of cold air for quenching would not be solved, so that it is practically impossible to create relatively isothermic conditions.

In reality, all the "hot" curving stations are equipped with an outlet door with means for rapid opening and closing. Nevertheless, each time this door is opened, a very considerable amount of cold air enters. In a plant with a high throughput rate, the instant at which the door opens to permit the exit of a glass sheet, the shaping of which has just been completed, may correspond to the quenching of the preceding glass sheet and the entry into the curving station of the succeeding glass sheet. The flow of cold air will therefore lick the rollers and, in particular, will cool the succeeding glass sheet, which evidently is very harmful to the latter.

To overcome this, it is known to line the door of the curving station with a hot air curtain, generated by burners situated in the curving station. A descending curtain of hot air has the disadvantage of pushing back the cold air penetrating into the station towards the conveyor and therefore towards the succeeding glass sheets, whereas an ascending curtain of hot air must be emitted at a pressure sufficiently low so as not to cause the lifting of the glass sheet which is passing through the hot air curtain. This systematic limitation to the permitted pressure does not allow complete compensation of the flow of cold air, so that it is necessary to provide precise synchronization of the movements of the different glass sheets, in order that the arrival of the glass sheet shall be sufficiently late for homogenization of the temperature of the curving station to take place between two glass sheets.

SUMMARY OF THE INVENTION

Accordingly, one object of this invention is to provide for a novel method of shaping glass sheets which minimizes the influence of the penetration of cold air into the curving station, thereby making higher production rates possible. In the method according to this invention the glass sheet penetrates into the curving station in a substantially horizontal direction at a storey defined as a lower storey and leaves this curving station, still in a substantially horizontal direction, but at a storey defined as a higher storey, distinct from the lower storey. In the present invention, the term "storey" is used to indicate that the curving station is seen as a succession of at least two superimposed chambers—but without walls defining the floor and the ceiling, certain elements being situated solely at a given storey (for example, the conveyor, which brings in the glass sheets from the furnace exit), or the frame which removes the glass sheets after shaping), others such as the glass sheets pass from one storey to the other.

In such a configuration, the cold air penetrates very much above the level of entry of the glass sheets, at a level close to the vault of the curving station. Since the latter is equipped with heating resistors designed for keeping an adequate temperature, the cold air is then immediately heated and does not disturb, to any great extent, a sheet of glass conveyed to the lower level.

This effect is still further reinforced if, in accordance with a preferred embodiment of the invention, the entry door is lined with a curtain of hot air produced by means of heating resistors situated between the lower level and the upper level. This hot air curtain contributes to the heating of the cold air, but in particular deflects the path of this cold air by directing it towards the vault of the curving station and the resistors which are situated there, so that not only is the cold air warmed but furthermore it is diluted in the mass of hot air of the curving station.

A further object of this invention is to provide for a novel method of shaping glass sheets, capable, if desired, of operating in accordance with the two-storey method described above. In fact, different means have been proposed for the application of the sheet glass against the curving mold. In a first series of methods, exemplified notably by the Patent Application WO 85/05100, the glass sheet is raised and is pressed by a lower mold, composed of a peripheral ring raised through the conveyor.

In a second series of methods, to which the present invention more especially belongs, the application is carried out by forces of a pneumatic nature. Thus, according to the theory of the Patent FR 2 085 464, the glass sheet is sucked by a sub-pressure created at its periphery. It is also known, for example from the Patent EP 3 391, to use an upper section mold having a plane or very slightly arched surface perforated with numerous holes distributed over its entire area, which communicate with a suction chamber in such a way that the glass sheet shall be sucked. Finally, it is also known, from European Patent EP 169 770, to use a current of hot gas having a wide section, directed vertically upwards, which exerts upon the lower face of the glass sheet sufficient force to raise it and to apply it against the curving mold, the curvature of which it therefore hugs.

In the case of the curving methods in which the glass sheet is sucked by a peripheral sub-pressure, the curving mold is placed in an open-bottomed chest, also termed skirt, connected to suction means, and the contour of which is slightly larger than that of the glass sheet, cut out but not yet curved. The rise of the curving mold corresponds to the rise which is desired to be imparted to the glass sheet, which is, in contrast, of dimensions slightly larger than those of the curving mold.

On account of the presence of this projecting chest, the centering of the body of glass beneath the curving mold must be carried out with great precision, since the glass must not touch the walls of the chest and thus be marked by them, which would have the effect of a decreased optical quality, unacceptable for an automobile pane.

Another limit to this process lies in the shapes of pane which can thereby be obtained and in the practical impossibility of obtaining panes of complex curvature, that is to say possessing in certain regions, most commonly localized near the edges of the pane, small radii of curvature. It should be noted that this type of pane is frequently encountered, by reason of the need to integrate, into the glazed part of automobile vehicles, elements intended, for example, to improve the streamlining of the vehicle, for example, a rear pane comprising a fold, which fulfills the function of an overlay or an immovable deflector, fixed to the frame of the lateral panes of the front doors of the vehicle. This limitation arises from the fact that the projection, on a horizontal plane, of such a curved pane is of a dimension clearly smaller than that of the flat sheet from which this pane originates. As a consequence, the lateral leakage, that is to say the distance between the edges of the glass sheet and the lateral walls of the chest, increases progressively as the shaping of the glass progresses, unless a chest profile is chosen which corresponds exactly to the path of the edge of the glass sheet, a solution that would be difficult and impractical, because then a new chest would be necessary for each change in manufacture and, moreover, in order to accurately determine this path of the edge of the glass sheet, many tests might be necessary.

Thus, if a standardized chest is used, the operator finds himself in a paradoxical situation, in which the pneumatic force which acts at a portion of the glass sheet becomes smaller, the larger the curvature which it is desired to give to this part.

It is known to carry out in these conditions, after a curving operation making use of pneumatic forces, a complimentary shaping by pressing by means of an annular counter-mold, which is placed beneath the upper curving mold holding the glass sheet, and this counter mold may later serve as a support for the glass sheet during its quenching. The improving of this complimentary curving, notably the optimization of the pressing duration, is made difficult by the lack of visibility due to the presence of the chest. In practice, there will be a tendency to continue the pressing whereas the glass sheet has already virtually adopted the desired curvature by means of the curving mold and an instantaneous pressing would be sufficient for completing the curve. For this reason, the curving cycle is extended.

Furthermore, the open-bottomed chest or skirt can damage the pressing elements during introduction.

A further object of this invention is to provide for an improved method of curving a glass sheet which makes possible, in a simplified manner, the production of glass sheets with complex curvature, notably at the edges. Another subject of the invention is a device suitable for carrying out the method according to this invention which makes it possible to observe the path followed by the glass sheet during its shaping.

In accordance with the method described in Patent FR 2 085 464, the glass sheet is preheated above the softening point of the glass and is conveyed, in a horizontal position, to the shaping cell, and is there lifted above the conveyor until it comes into contact with a curving mold mounted in a suction chest. This method is characterized by the use of a suction chest composed of two elements movable relative to each other, a lower element and an upper element carrying the upper mold, in such a manner that a receiving carriage for the glass can penetrate between the lower part of the chest and the upper part of the chest when the latter part is in a raised position.

Preferably, a large pneumatic force is applied during the transfer phase of the glass sheet from the bed of rollers to the upper curving mold which corresponds to the period during which the depression chamber is bounded by the lower part of the suction chest—for the purpose of channelling the depression in an optimum manner in order to promote the ascent. Then, while the glass sheet is applied against the upper curving mold, the applied pneumatic force is reduced slightly in order to prevent those parts of the pane which come into contact with the curving mold first, and therefore for the longest time,—that is to say generally the central part of the pane—from being marked by the mold, which would lead to optical defects.

The taking over of the glass sheet is achieved by a suction created at its periphery, the zone subjected to suction being bounded by the walls of the lower part of the chest. These walls are preferably upright and thus constitute a vertical duct, the height of which is preferably approximately equal to the height of the free travel of the glass sheet, that is to say of the path which the glass sheet must follow before coming into bearing against the upper curving mold.

The upper part of the chest is preferably shaped, that is to say that the walls have a profile which corresponds approximately to the path of the edge of the glass sheet, in such a way as to maintain a constant distance between the glass and the edge of the chest.

A suction chest is advantageously used, the upper part of which projects a little beyond the curving mold, and at the limit, deflectors are placed at the periphery of the curving mold at the necessary locations, strictly as a function of the requirements of curving, without taking into account questions of bringing the glass sheet right up to the upper curving molding. Moreover, the lowest level defined by these deflectors or the walls of the upper part of the chest is preferably higher than the lowest level of the curving mold, or in other words this mold descends slightly lower than that part of the chest. Thus, the lateral leakage is of small dimensions at the end of the curving process, which allows better management of the shaping in the most highly curved zones, generally at the edges of the pane.

When the upper part of the chest and the curving mold, which is integral therewith, are raised, in accordance with this invention there remains a free zone between the lower part of the chest—which we shall hereinafter term "vertical duct"—and the upper part of the chest—which we shall again term "skirt". The height of this free zone is chosen in such a way as to permit the introduction of a carriage carrying an annular skeleton, the outline of which corresponds essentially to the curvature or rise which it is desired to give the glass. Since the skirt is preferably very short, it does not interfere with the entry of the skeleton, even for highly curved shapes. Furthermore, it permits perfect viewing of the glass sheet at the instant at which this sheet hugs the contours of the curving mold.

The advantage of observation is certainly very great during the course of industrial development, for example of a new set of equipment—set of equipment is to be understood as comprising the upper mold and its chest as well as the quenching skeleton or skeletons and/or pressing skeleton or skeletons—notably for the purpose of defining the periods necessary for possible complementary pressing shapes. Observation is also very useful during manufacture, since it enables the work of the personnel responsible for carrying out the adjustments at each change of type of glass body to be guided, changes which occur several times per day.

For carrying out the method according to this invention, it is appropriate to use a suction chest composed of two distinct elements. In a first example, the lower part of the chest or vertical duct may be fixed and the upper part of the chest or skirt may be movable.

The use of a fixed vertical duct gives a particularly reliable reference base, enabling the exact position of the glass sheet to be determined with great accuracy and enabling it to be recentered if necessary. Furthermore, since the skirt comes into bearing against the vertical duct in a low position, a very precise positioning in height of the upper curving mold is also achieved, which is certainly a gauge of the quality of shaping.

As indicated earlier, the invention is suitable particularly for the manufacture of highly curved panes, for which the quenching and pressing skeleton could not otherwise enter the suction chest. It is therefore self-evident that the shaping process will usually be complimented or completed by a pressing step, although this does not in any way modify the principle of this invention.

The method of shaping just described may be adapted to an installation comprising an entry and an exit at different levels. But more generally, the principle of entry and of exit at different levels may be adapted to any of the shaping methods in a horizontal position, according to which the glass sheet is brought on a conveyor until it arrives at a position accurately underneath a curving mold, and is then raised by forces of a pneumatic or mechanical type until it comes into bearing against the curving mold, the curvature of which it hugs, if necessary with the help of a supplementary pressing. In these methods—of which detailed examples will be found in the aforementioned Patent Publications WO 85/05100, FR 2 085 464, EP 3391 or EP 169 770—for the taking-over of a sheet the curving mold is very near the feed conveyor for the glass sheets and therefore, at this instant, is situated at the lower storey. Once the glass sheet has been applied against the curving mold, it is known according to conventional art to lift the curving mold slightly in order to introduce a carriage carrying a frame which serves for the removal of the glass sheets. But this frame also itself moves at the lower storey, at a level substantially equal to that of the feed conveyor. In contrast, in accordance with the present invention, the curving mold is raised by a height considerably greater than the height that would be necessary solely for the purpose of permitting the introduction of the carriage, and it is therefore in this high position, at the upper storey, that the removal is carried out. It should be noted that the distance which the glass sheet travels from the instant at which it is applied to the curving mold is virtually immaterial from the point of view of the quality of shaping, whereas this obviously is not the case for the distance travelled by the glass sheet alone for coming into contact with the curving mold.

Another indirect advantage of this invention is that it makes possible the disposition, in the same alignment with the furnace, of the curving station and of the cooling station, notably quenching station. In fact, and unless provision is made for retracting the quenching chests, it is not possible to remove a glass sheet directly out of the curving station (that is to say without causing it to undergo the entire shaping cycle) by passing it through the exit intended for correctly shaped panes, this being due to the fact that panes of complex shape must be quenched in quenching blowing chests of such a shape that a flat sheet of glass cannot enter them. When the feed conveyor is at a different storey from the exit storey, it is possible, in contrast, to continue this conveyor by a device for removing and breaking up bodies of glass which are to be directly removed. This removal is carried out, for example, by a method, according to which the glass sheets are heated in a furnace, are brought in a horizontal position into a curving station where they must be taken over by curving tools, then transported into a cooling, notably quenching station, the defective bodies of glass being removed at the end of the curving station and being cracked for this purpose by atomization of a cold fluid, and then crushed.

The atomization of the cold fluid—for example water—takes place preferably while the glass sheets are in movement on a discharge conveyor, immediately before being crushed. In this way, even the glass volumes of large dimensions can be reduced into fine pieces over a very short distance, which does not exceed for example 300 mm. This very small bulk enables the discharge system to be easily accommodated according to this invention between a quenching station and a curving station disposed in alignment with the heating furnace for the glass sheets.

If necessary, the functioning of the discharge system may be triggered in whole or in part by the detection of the presence of a defective body. The detection may thus govern the atomization of the cold fluid and the bringing into place of the crushing system, which is fitted in between two interventions, in order to not interfere with the movements of the correctly curved glass sheets, or again may govern the starting up of the crushing means.

Such a detection is not, however, essential if the discharge system according to this invention is advantageously applied to a production line for curved and tempered glass sheets, for which the level of the glass sheets in the quenching station is different from the level of the glass sheets during their travel into the furnace. In this case, the discharge system for the glass sheets, which by definition is located at the level of the conveyor for the furnace which generally forms the lower level, is preferably made to operate continuously, since its operation cannot interfere with the treatment of the correctly curved glass sheets, which are displaced at a higher level.

The discharge device for the defective bodies which is fitted to the curving installation in a horizontal position comprising a heating furnace for the glass sheets equipped with a conveyor, a curving station and a cooling station, notably quenching station, is situated on the axis of the furnace, at the end of the curving station and fed by a conveyor continuing the conveyor of the furnace, and is composed essentially of at least one perforated pipe for atomizing cold fluid and means for crushing the glass. As the crushing means, there may advantageously be used a crushing mill or a hammering tool, such as a harrow moving vertically up and down. The crushing mill is, for example, formed of a rotationally driven roller provided with teeth. If necessary, notably if the device is fitted to a production line, in which the levels of feed of the glass and quenching of the curved sheets are not sufficiently widely spaced apart, the crushing means such as a crushing roller are mounted on an equipment which can be moved, for example vertically, enabling these means to be retracted between two defective bodies and a free passage to be left, for example, for the quenching frame. In this case, the discharge system is of necessity equipped with a detection device for detecting the presence of a defective body not taken over by the curving tools. This detection device, which in particular may be of the type described in the Patent EP-A-217 708, then serves for instructing the start of atomization of the cold fluid and the raising of the movable equipment.

This discharge device is advantageously protected by a casing to prevent any entry of cold air or it may closed by a curtain, for example of asbestos, which the defective glass bodies lift to enter the discharge device (such a curtain is not possible for the exit of correctly shaped glass sheets, by reason of the risks of marking, which are quite unimportant here, since the glass sheet is going to be converted into scrap).

Accordingly, the present invention relates to a method of shaping glass sheets comprising the steps of: heating the glass sheets; transporting the glass sheets, in a horizontal position, into a curving station, wherein the glass sheets are taken over by curving tools; and conveying the glass sheets into a cooling or quenching station; wherein the glass sheets enter and exit the curving station at storeys of different height.

The present invention also relates to a production line for producing curved glass sheets comprising: a furnace for heating the glass sheet; a curving station; means for removing defective bodies of glass; and a cooling station; wherein the furnace, the curving station, the means for removing defective bodies of glass, and the cooling station are successively disposed in the same alignment, the level of the glass sheets in the cooling station being different from the level of the glass sheets during their passage through the furnace and the curving station.

The present invention also relates to a method of curving a sheet of glass comprising the steps of: preheating the glass sheet to a temperature above the softening point of the glass; conveying the glass sheets by way of a conveyor, in horizontal position, to a shaping cell; raising the glass sheet within the shaping cell, above the conveyor until the glass sheet comes into contact with a curving mold mounted in a suction glass, wherein the suction chest comprises two elements, the two elements being movable relative to each other, one of the two elements being an upper element for carrying the curving mold so that a carriage for receiving the glass sheet can enter between the two elements when the curving mold is in a raised position.

The present invention further relates to an apparatus for curving a sheet of glass for producing automobile panes or the like, comprising: a heating furnace for heating the glass; a conveyor for transporting the glass; a curving cell; a curving mold; and a suction chest; wherein the suction chest comprises a vertical duct and a skirt, the skirt being movable relative to the duct and integral with the curving mold.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
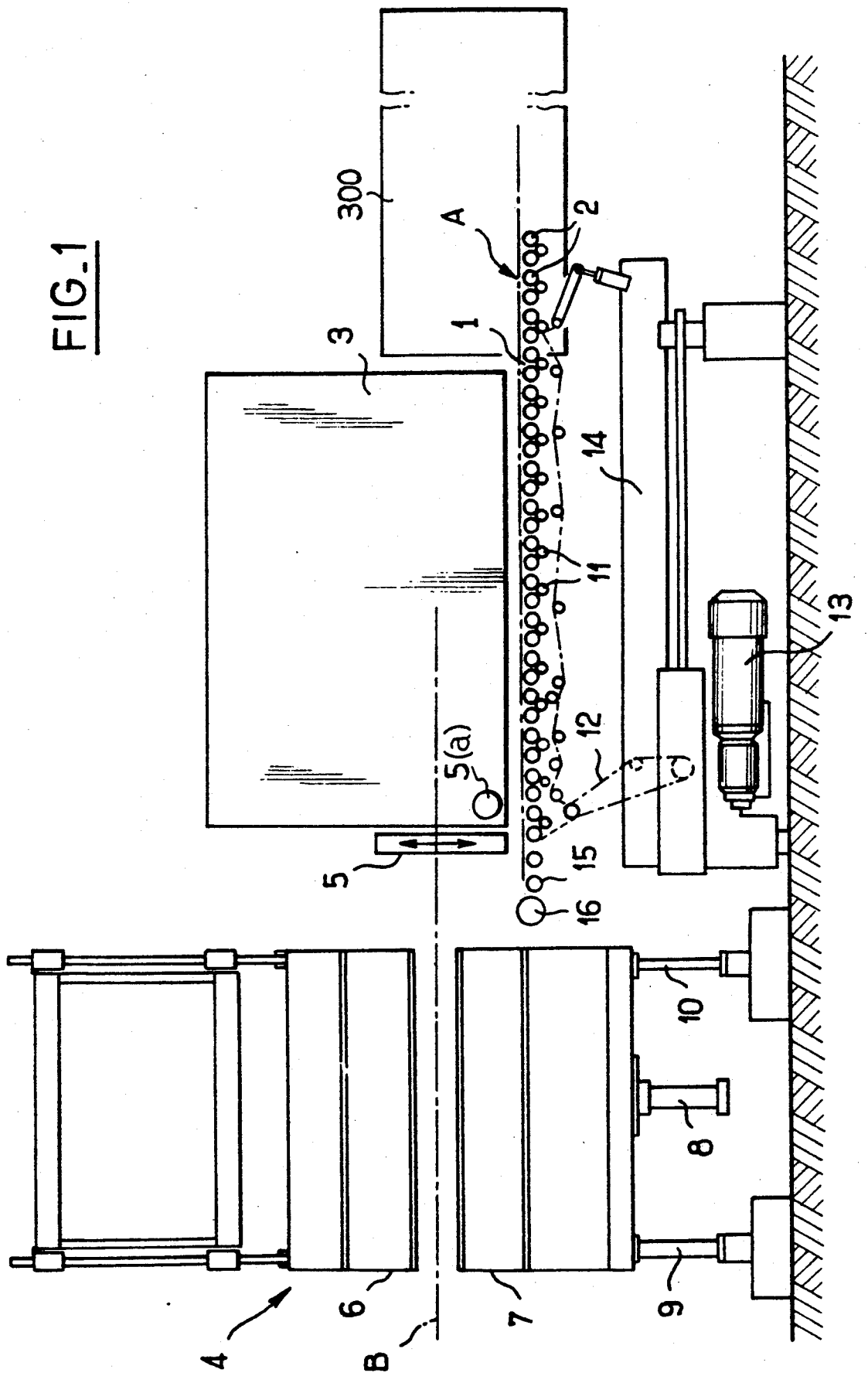
FIG. 1 shows a layout for a curving-quenching installation, arranged in line, equipped with a system for removing defective bodies according to this invention.
Figure 3:
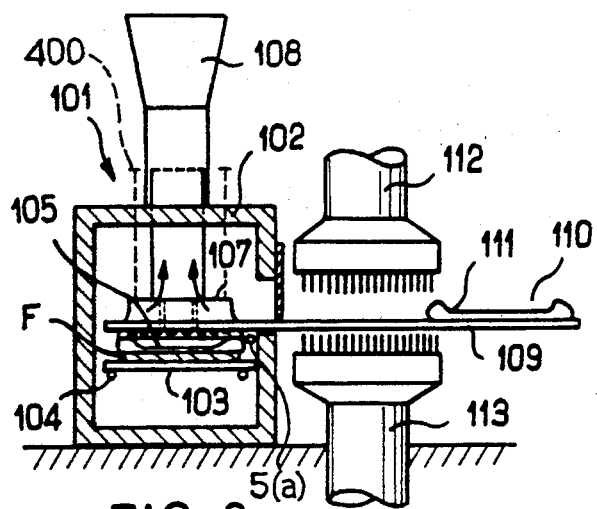
FIGS. 3 to 8 show the relative positions of the principal elements required for carrying out the method according to the invention, during the successive steps of treatment of a glass sheet.
Figure 4:
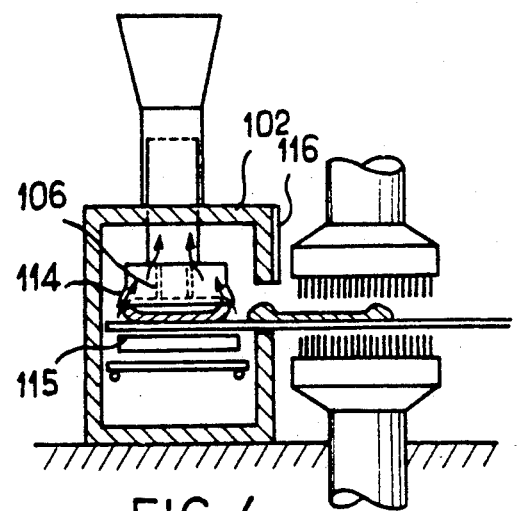

The curving-quenching installation indicated systematically in FIG. 1 comprises a furnace 300 for heating the glass sheets one by one. The glass sheets are brought through the furnace by a conveyor 1, for example possessing rollers 2, the reference level of which is indicated by the broken line A. Following the furnace, the glass sheets, heated to their tempering and curving temperature, enter the curving station 3. This curving station 3 comprises, for example, a tool-carrying assembly equipped with a lifting system. This assembly is composed, for example, of an upper curving mold surrounded by a depression chest, connected to a suitable suction device, the curving mold being raised and lowered during a curving cycle, for instance by means of chains 400, illustrated in FIG. 3 fixed to the tool-carrying assembly. Examples of curving tools or molds and curving methods used in such methods are described, for example, in Patent Applications EP 240 418 and EP 241 355.

A frame, for example a quenching frame, collects the sheets of glass after they have been curved. This frame displaces along a level B, considerably higher than the level A which is the level of entry of the glass sheets into the curving station 3. It can therefore be seen that this installation comprises two distinct storeys. Once the glass sheet has been deposited on the quenching frame, it is conducted to the quenching station 4 after the door 5 has been opened. Also provided is a heating resistor 5(a) for lining the door (5) with a current of hot air.

This quenching station 4 comprises two blowing chests 6 and 7, mounted on a jack 8 and guided by slides 9, 10 in such a manner as to allow the chests to be separated for any maintenance. Ducts, not shown here, are provided for the feed of blowing gas. The mean level of glass in the quenching station 4 is the level B; the expression "mean level" recalls that the glass sheet is then curved to a more or less complex shape and that in fact the two blowing chests have a shape conforming to the surface of the curved glass sheet.

Referring now to the curving station 3, it will be noted that it comprises, beneath the tool-carrying assembly, a conveyor 1 constituting a continuation of the feed conveyor through the furnace. This conveyor is composed of rollers 2, resting on small rollers 11 and driven by chains 12, themselves driven by a motor 13, the assembly being supported by a beam 14. All these elements, well known to the person skilled in the art, have been indicated here only schematically in order to give an idea of the overall size of the various elements and of the difficulty which results therefrom in laying out a discharge device for the defective bodies of glass. In order to prevent a certain cooling down of the glass, which would decrease the effectiveness of the quenching blowing, the quenching station must be situated as near as possible to the curving station. For this reason, since the space available at the downstream end 15 of the conveyor 1 is particularly small and, notably, is not sufficient to allow defective bodies of glass to be dropped there as they are. This is why the installation is equipped with a discharge system, which has been indicated schematically here by the crushing roller 16, and which is shown in greater detail in FIG. 2.

Figure 2:
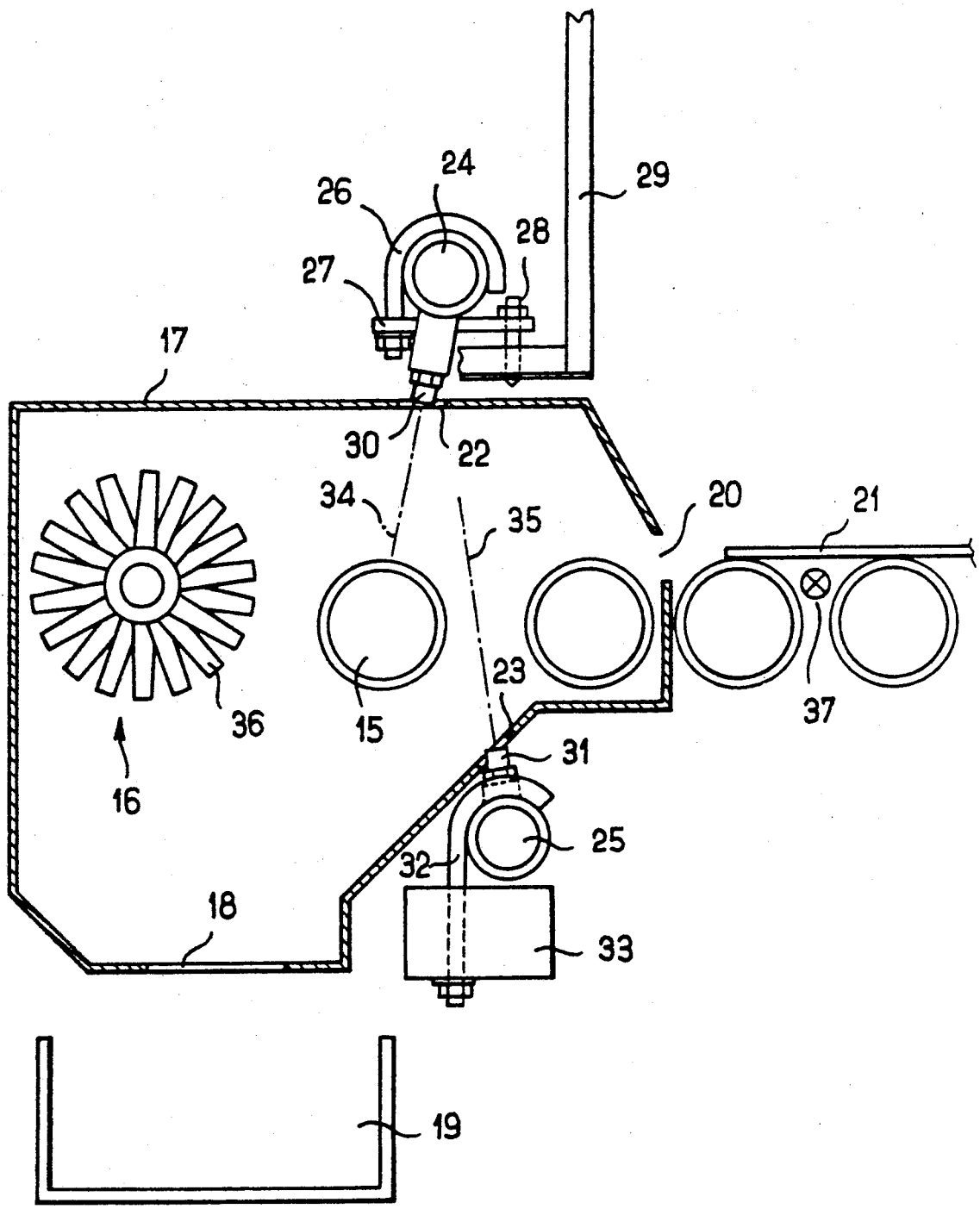
FIG. 2 shows an enlarged view of the discharge system for the defective bodies according to this invention.

In FIG. 2, the downstream end of the conveyor 1 with its last four rollers including the extreme roller 15, can be seen, the rollers in the present case being hollow and of silica. The discharge system is surrounded by a casing 17, the bottom of which is provided with a trap door 18, permitting discharge into a scrap pit 19. This casing 17 comprises an opening 20 for entry of a defective body 21, brought by the conveyor 1, and two apertures 22, 23. Opposite these apertures 22, 23 are mounted nozzle pipes 24 and 25, extending across the entire width of the conveyor 1. The upper nozzle pipe 24 is fixed by a fixing lug 26 to a support plate 27, mounted by means of bolts 28 on an appendage to the lateral wall 29 of the curving station. The nozzle pipe 24 is equipped with nozzles 30 for the atomization of a cold fluid, for example water. In a similar way, the lower nozzle pipe 25, equipped with atomization nozzles 31, is fixed by a fixing lug 32 to a support 33. These two nozzle pipes are equipped with water feed ducts, not shown here. They continuously discharge jets of atomized water 34, 35. Two nozzle pipes are used in the present case, but it is possible if necessary to operate the discharge system with one single nozzle pipe.

When the defective body at its curving temperature passes between the jets 34, 35, it is entirely cracked by reason of the extremely intense thermal shock. Nevertheless, the pieces of glass remain positioned alongside one another like the elements of a reconstituted jigsaw puzzle. This is why the discharge device must be completed by a crushing device, composed in the present case of a crushing roller 16, equipped with teeth 36 and rotationally driven by a device, not shown here. In contact with the teeth 36, the cracked glass breaks up into numerous fragments, which fall into the pit 19 after passing through the trap door 18.

In a preferred embodiment, a scrap pit is not provided underneath the discharge device but the scrap (cullet) is removed directly (and together with the atomized water) by an inclined vibrating conveyor belt. This inclined vibrating conveyor—or any other equivalent device—eliminates any need to stop for emptying.

The casing 17 occupies a very short length of the production line, preferably less than 300 mm, so that this assembly can be incorporated without difficulty into the space available between the curving and quenching stations. Furthermore, since the discharge device is protected by a casing, the atomization of water may be carried out continuously in an installation comprising two levels such as that shown in FIG. 1, without any risk of perturbing the treatment of the "standard" bodies of glass.

If it is not desired to continuously operate the discharge device, for example when the period of adjustment has passed, the line is equipped with a detector 37, indicating, when applicable, the presence of a defective body of glass near the extreme downstream end 15. After a delay, if necessary, the detector 37 then serves for initiating one or more of the operations such as the atomization, the rotation of the crusher roller, and the starting up of the vibrating conveyor.

A method of curving according to the present invention comprises the use of a suction chest having two elements movable relative to each other and an upper skirt-shaped element carrying the upper curving mold so that a receiving carriage for the glass can come between the two elements when the upper curving mold is in a raised position. The various steps of the process according to this invention, are indicated diagrammatically in FIGS. 3 to 9 and shall now be described. In the furnace 300, the axis of which would be perpendicular to the plane of the drawing, the glass sheets are heated one by one by being conveyed horizontally on a bed of rotationally driven rollers. Following the furnace, there is provided a curving cell 101, surrounded by refractory walls 102 in order to maintain, in this curving cell, a temperature near that of the glass heated to 500°-700° C. The sheet of glass, brought on rollers 103 resting on bearings 104, is stopped beneath the upper curving mold 105, which is attached by means of tension members 106 to the suction chest 107. The suction chest 107 is connected to a chamber 108 subject to partial vacuum, so that an ascending flow of air is created in the vicinity of the periphery of the upper mold 105.

Perpendicularly to the axis of the furnace, there are provided rails 109, on which a carriage 110 carrying a skeleton 111 runs. These rails pass between two quenching blowing chests 112, 113, and in contrast to conventional devices are situated at a level clearly higher than that of the rollers 103.

The glass sheet F is stopped and is correctly positioned beneath the upper curving mold, the latter is lowered into its low position (FIG. 3) in proximity to the surface of the sheet F. When it is desired to manufacture a pane of especially complex shape, the dimensions of the plane glass sheet are clearly larger than those of the projection onto a plane of the glass sheet after it has been curved. Also in accordance with this invention, the suction chest 107 is composed of two elements which are movable relative to each other, a vertical duct 115, for example fixed, and a skirt 114 integral with the upper curving mold 105. This vertical duct 115 is of upright section. Its contour is similar to the contour of the glass sheet F in the plane state, but projecting slightly beyond it in order to allow the peripheral suction of the glass sheet. The contour of the skirt itself follows the trajectory of the glass sheet during its shaping. The skirt therefore decreases in section and preferably has a curved wall. Since the skirt 114 comes into action only indirectly during the first phase of the operation, that is to say the phase of lifting during which the suction must be most effectively channelled, it can be very short with an upper curving mold 105 which projects largely at the bottom.

As soon as the glass reaches the curving mold (FIG. 4), the suction force is preferably decreased slightly in order to prevent any risk of damage to the glass. At this instant, the upper mold 105—and therefore the skirt 114—are raised into their upper position. The carriage 110 is then brought towards the curving cell 101, after the door 116, which separates the curving cell 101 from the quenching cell, has been opened.

Figure 5:
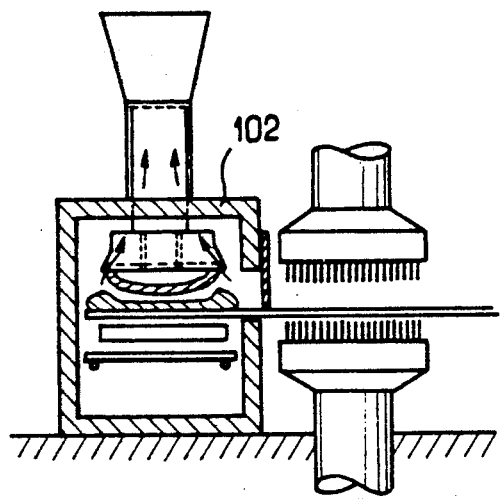
Figure 6:
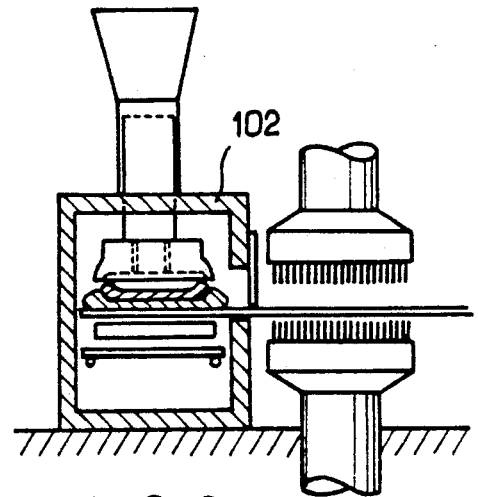
Figure 7:
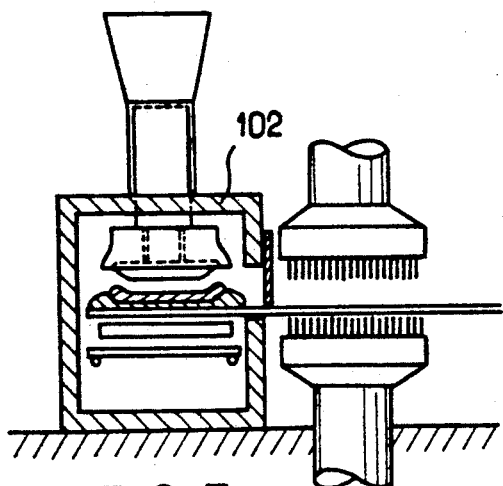
Figure 8:
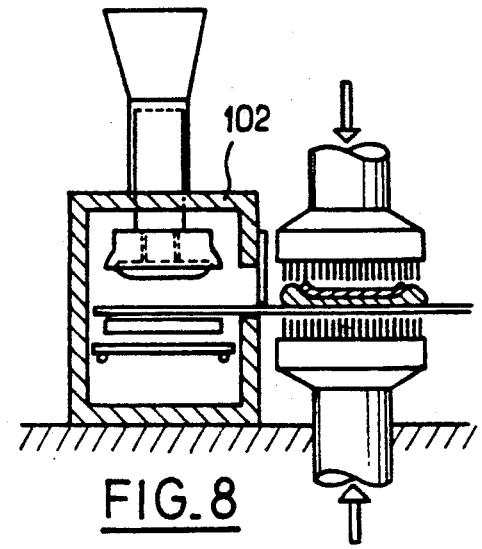

During this period, the glass sheet progressively hugs the contours of the curving mold. As can be seen in FIG. 5, this operation is not masked by the contours of the chest 107, because the upper part of this chest is simply composed of the skirt 114, which being very short simply forms deflectors around the upper mold 105 in order to channel the suction air currents. The associated skirt 114 and mold 105 are raised sufficiently to enable the carriage 110 to be inserted, even if the skeleton 111 is of a particularly complex shape. The upper mold is then lowered again (FIG. 6) in order to deposit the glass sheet F on the skeleton 111. This deposition may, if desired, be completed by pressing. In order to facilitate this pressing, it is also preferable to provide a positioning of the pressing mold controlled by jacks, for example hydraulic jacks, which govern the movements of the skirt 114, whether in the ascending or in the descending direction. These jacks enable a constant pressure to be assured without taking into account the weight of the upper mold and of the skirt. The mold 105 is again raised in order to release the skeleton (FIG. 7), which now conducts the sheet F between the blowing chests, where the quenching operation is carried out (FIG. 8).

Figure 9:
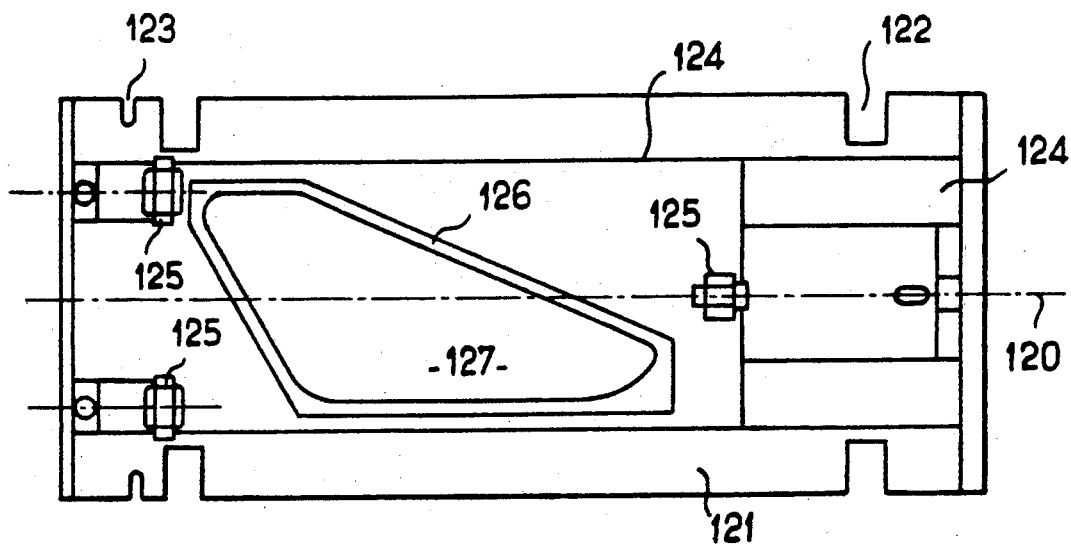
FIG. 9 shows a schematic view from below of a vertical duct, which can be seen in FIGS. 3 to 8.
Figure 10:
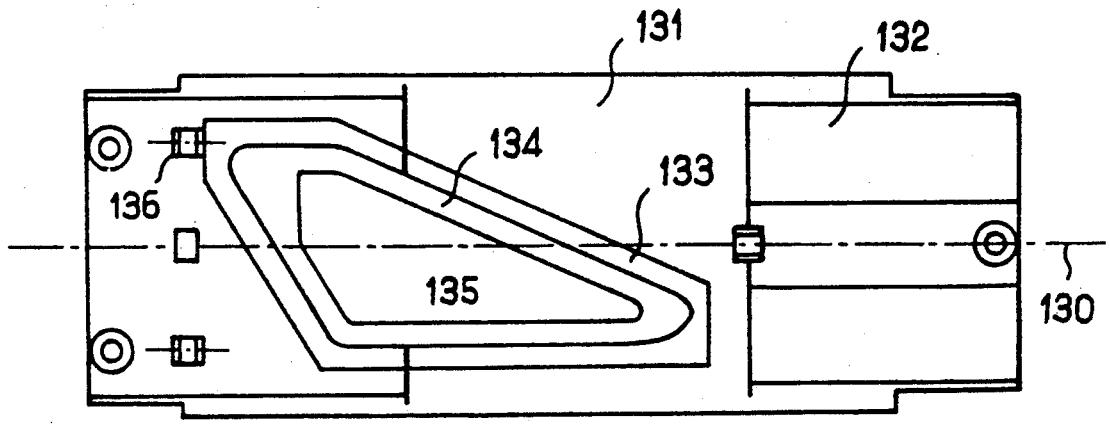
FIG. 10 shows a schematic view from below of the movable skirt, which can be seen in FIGS. 3 to 8.

For carrying out the method described above, a chest composed of the elements shown in FIGS. 9 and 10 may advantageously be used.

FIG. 9 concerns the lower part of the chest, here again termed vertical duct. The axis of the furnace is indicated by the broken line 120. This part of the chest is composed essentially of a plate 121, cut from a metal sheet and comprising notches 122, 123 for fixing it on suitable support means, for example of the bar type, so that the plate can slide and can be very rapidly replaced. To prevent any deformation in spite of the temperature of the cell and the large dimensions of the panes, this plate is provided with stiffeners 124. The vertical duct 126, the aperture 127 of which corresponds, with slight excess dimensions, to the dimensions of the glass pane when flat, is fixed to this plate 121 by appropriate fixing means 125.

This part of the chest may be mounted fixed or vertically movable through a short distance of travel, of a height sufficient to allow an incorrectly sucked up glass sheet to be disengaged.

The upper part of the chest or skirt—still movable—is indicated schematically in FIG. 10. The axis of the furnace has been indicated here by the broken line 130. On a plate 131, preferably of metal sheet equipped with stiffening elements 132, a plate 133 is fixed by gusset plates 137, which can be seen in FIG. 11.

These two plates support the skirt 134. Fixing is provided by means 136. The aperture 135 corresponds to the overall size of the pane after shaping.

Figure 11:
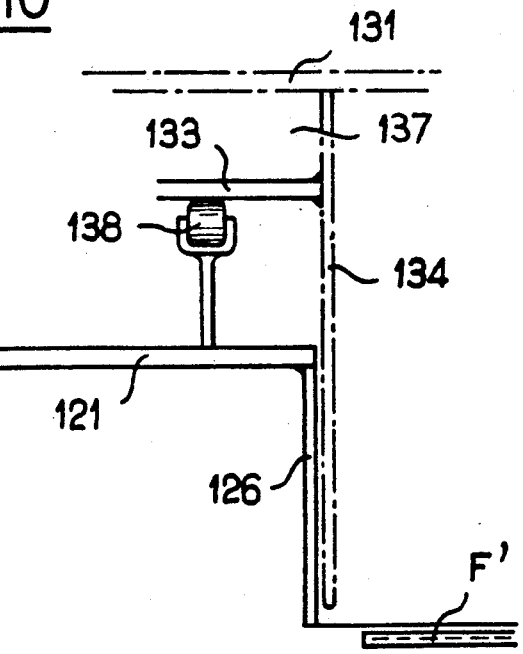
FIG. 11 shows a view from the side of the vertical duct according to FIG. 9 and of the movable skirt according to FIG. 10 in a low position.

As indicated schematically in FIG. 11, where the vertical duct 126 and the skirt 134 are shown in the position for sucking a glass sheet F', the travel of the skirt 134 is limited by a bearing of plastics material 138, against which the plate 133 comes into bearing when the skirt is in its lower position.

The vertical duct 126—having a constant cross-section—preferably serves as a support for centering means, for example pushers by jacks, which pushers allow the glass sheet F' be positioned very accurately at the center of the duct 126. During this positioning, a slight suction and/or a slight vertical blowing by a current of hot air is created in the chest. The purpose of this is partly to relieve the rollers of the conveyor from the weight of the glass sheet F', so that there is no risk of this sheet being marked. It should be noted that, even when the vertical duct is movable in height, it is in a position in close proximity to the plane of the rollers of the conveyor during a period much longer than that available for the upper curving mold, and that it is therefore possible to carry out a much more accurate positioning.

Obviously, numerous additional modifications, and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of curving a sheet of glass comprising the steps of:
    preheating the glass sheet to a temperature above the softening point of the glass;
    conveying said glass sheet by way of a conveyor, in a horizontal position, to a shaping cell including a curving mold mounted in a suction chest;
    transferring said glass sheet, within said shaping cell, above said conveyor by applying a suction force until the glass sheet comes into contact with the curving mold mounted in the suction chest and curving the glass sheet while in contact with the curving mold, wherein said suction chest comprises two elements, at least one of said two elements being movable relative to the other, one of said two elements being an upper element for carrying the curving mold so that a carriage for receiving the glass sheet can enter between the two elements when the curving mold is in a raised position.

2. A method according to claim 1, wherein a greater suction force is applied during the transfer of the glass sheet from the conveyor to the curving mold than during curving of the glass sheet while in contact with the curving mold.

3. A method according to one of claims 1 or 2, wherein the other of said two elements of said suction chest is a lower element which is fixed.

4. A method according to claim 1, wherein the other of said two elements of said suction chest is a lower element which is movable.

5. A method according to claim 4, wherein said lower element serves as a reference element for centering of the glass sheet on the conveyor.

6. A method according claim 5, wherein said receiving carriage supports a pressing skeleton.

7. A production line for producing curved glass sheets comprising;
    a furnace for heating the glass sheets;
    a curving station;
    means for removing defective bodies of glass; and
    a cooling station;
    said furnace, said curving station, said means for removing defective bodies of glass, and said cooling station being successively disposed in the same alignment, and the level of the glass sheets in the cooling station being different from the sheets during their passage through the furnace and the curving station, wherein said means for removing defective bodies of glass comprises atomization means for discharging jets of atomized fluid, said defective bodies being cracked by said atomized fluid, said means for removing defective bodies of glass further comprising crushing means for crushing said glass after said glass is cracked.

8. Production line according to claim 7, wherein said fluid is atomized onto the defective bodies while said defective bodies are in motion.

9. Production line according to claim 7, wherein said atomization is carried out onto both faces of the defective bodies.

10. Production line according to claim 9, wherein said means for removing the defective bodies operate permanently and continuously.

11. Production line according to claim 9, wherein said means for removing defective bodies of glass comprises detecting means for detecting the presence of a defective body, said means for removing defective bodies of glass operating intermittently and being governed by the detection of the presence of a defective body.

* * * * *